(12) United States Patent
Parlante

(10) Patent No.: US 10,931,170 B2
(45) Date of Patent: Feb. 23, 2021

(54) MOTOR COOLING UTILIZING CABIN AIR

(71) Applicant: Hamilton Sundstrand Corporation, Charlotte, NC (US)

(72) Inventor: Kyle Robert Parlante, West Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 461 days.

(21) Appl. No.: 15/591,662

(22) Filed: May 10, 2017

(65) Prior Publication Data

US 2018/0331599 A1 Nov. 15, 2018

(51) Int. Cl.
*H02K 9/04* (2006.01)
*H02K 7/14* (2006.01)
*B64D 37/32* (2006.01)
*B64D 13/02* (2006.01)
*B64D 13/06* (2006.01)
(Continued)

(52) U.S. Cl.
CPC .............. *H02K 9/04* (2013.01); *B64D 13/02* (2013.01); *B64D 13/06* (2013.01); *B64D 13/08* (2013.01); *B64D 37/32* (2013.01); *F25B 13/00* (2013.01); *F25B 31/026* (2013.01); *H02K 7/14* (2013.01); *B64D 2013/0603* (2013.01); *B64D 2013/0618* (2013.01); *B64D 2013/0644* (2013.01); *B64D 2013/0648* (2013.01); *B64D 2013/0688* (2013.01)

(58) Field of Classification Search
CPC ............ H02K 9/005; H02K 9/02; H02K 9/04;
H02K 9/06; H02K 9/08; H02K 9/10;
H02K 9/12; H02K 9/14; H02K 9/16;
H02K 9/18; H02K 9/19; H02K 9/193;
H02K 9/197; H02K 9/20; H02K 9/22;
H02K 9/24; H02K 9/26; H02K 9/28;
H02K 1/20; H02K 1/32; H02K 3/24;
H02K 5/12; H02K 5/20; Y02T 50/56;
Y02T 50/44; B64D 13/06; B64D
2013/0688; B64D 2013/0644; B64D
2013/0618; B64D 2013/0648; F04D
29/5806; F04D 25/06; F04D 29/06
USPC ..... 310/52, 53, 54, 55, 56, 57, 58, 59, 60 R,
310/61, 62, 63, 64
See application file for complete search history.

(56) References Cited

U.S. PATENT DOCUMENTS 5,701,755 A 12/1997 Severson et al.
5,770,899 A * 6/1998 Hayashi .............. G03F 7/70716
310/12.06
7,302,804 B2 12/2007 Murry et al.
(Continued)

FOREIGN PATENT DOCUMENTS

EP 1806288 A2 7/2007

OTHER PUBLICATIONS

Extended European Patent Report for European Patent Application No. 18171633.3, dated Jun. 22, 2018, 9 pages.
(Continued)

*Primary Examiner* — Quyen P Leung
*Assistant Examiner* — Alexander A Singh
(74) *Attorney, Agent, or Firm* — Kinney & Lange, P.A.

(57) ABSTRACT

A system for cooling a motor includes a rotary machine and a cooling flow path. The rotary machine includes a motor including a rotor and a stator, a compressor including a compressor rotor, and a shaft extending between the motor and the compressor rotor. The cooling flow path is configured to deliver cooling air from a cabin of an aircraft to the motor.

16 Claims, 3 Drawing Sheets

(51) Int. Cl.
    *B64D 13/08*     (2006.01)
    *F25B 13/00*     (2006.01)
    *F25B 31/02*     (2006.01)

(56) References Cited

U.S. PATENT DOCUMENTS

| | | |
|---|---|---|
| 9,470,218 B2 | 10/2016 | Eowsakul |
| 2004/0261428 A1* | 12/2004 | Murry .................. B64D 13/06 62/86 |
| 2007/0062371 A1 | 3/2007 | Eilers |
| 2008/0168796 A1* | 7/2008 | Masoudipour .......... H02K 9/19 62/505 |
| 2010/0072837 A1* | 3/2010 | Telakowski ............ B64D 13/06 310/59 |
| 2011/0131999 A1 | 6/2011 | Gao et al. |
| 2014/0326135 A1 | 11/2014 | Massey et al. |
| 2014/0357176 A1 | 12/2014 | Beers et al. |
| 2015/0004011 A1 | 1/2015 | Army et al. |
| 2015/0104301 A1 | 4/2015 | Colson et al. |
| 2015/0314877 A1 | 11/2015 | McAuliffe et al. |
| 2016/0153460 A1 | 6/2016 | Okabe |
| 2016/0311551 A1 | 10/2016 | Daniello |
| 2017/0005544 A1* | 1/2017 | Pal ..................... F04D 29/5806 |

OTHER PUBLICATIONS

Communication pursuant to Article 94(3) EPC for European Patent Application No. 18171633.3, dated Oct. 22, 2019, 5 pages.

* cited by examiner

MOTOR COOLING UTILIZING CABIN AIR

BACKGROUND

The present disclosure relates to cooling of electric motors use on aircraft. More specifically, the present disclosure relates to motor cooling utilizing cabin air.

Electric motors are used on aircraft to drive compressors to compress air for use in systems that control the flow of air through the aircraft. One example includes cabin air compressors that are used to compress air to be delivered to an air cycle machine. Air cycle machines are used in environmental control systems to condition air for delivery to the aircraft cabin. Cabin air compressors include an electric motor that is connected to a compressor via a shaft to drive the compressor. Another example includes motor driven compressors that are used to compress air to be delivered to a nitrogen generation system. Nitrogen generation systems are used to produce nitrogen enriched air for delivery to a fuel tank for fuel tank inerting. In some cases, motor driven compressors include an electric motor that is connected to two compressors via a shaft to drive both of the two compressors.

Electric motors generate significant heat and need to be cooled. There are two methods typically used to air cool electric motors on an aircraft. The first method includes using ram air to cool the motor. Ram air is air that is scooped from a ram air duct on the skin of an aircraft for use as cooling air on the aircraft. Scooping air through a ram air duct creates drag on the skin of the aircraft, reducing the overall efficiency of the aircraft. Further, the temperature of ram air is dependent on the altitude at which the aircraft is flying and can change significantly during a flight. The second method includes using air from the compressor that is being driven by the motor to cool the motor. Air will be drawn in and compressed with the compressor and then some of the compressed air will be bled, then cooled (typically by passing it through a heat exchanger) before being passed to cool the motor. Bleeding air from the compressed air reduces the efficiency of the compressor. Further, the compressed air will be heated when it is compressed and will not be significantly cooler than the temperature of the motor. The temperature of the motor cooling air will be a function of heat exchanger cooling capability, which typically utilizes ram air to cool. Utilizing ram air in this means adds additional drag to the aircraft as mentioned above.

SUMMARY

A system for cooling a motor includes a rotary machine and a cooling flow path. The rotary machine includes a motor including a rotor and a stator, a compressor including a compressor rotor, and a shaft extending between the motor and the compressor rotor. The cooling flow path is configured to deliver cooling air from a cabin of an aircraft to the motor.

A method of cooling a motor includes ducting air along a cooling flow path from a cabin of an aircraft to a motor of a rotary machine. The motor is connected to a compressor rotor of a compressor with a shaft. The motor is cooled with the cabin air. The air is ducted along the cooling flow path from the motor to a location overboard the aircraft.

DETAILED DESCRIPTION

Figure 1:
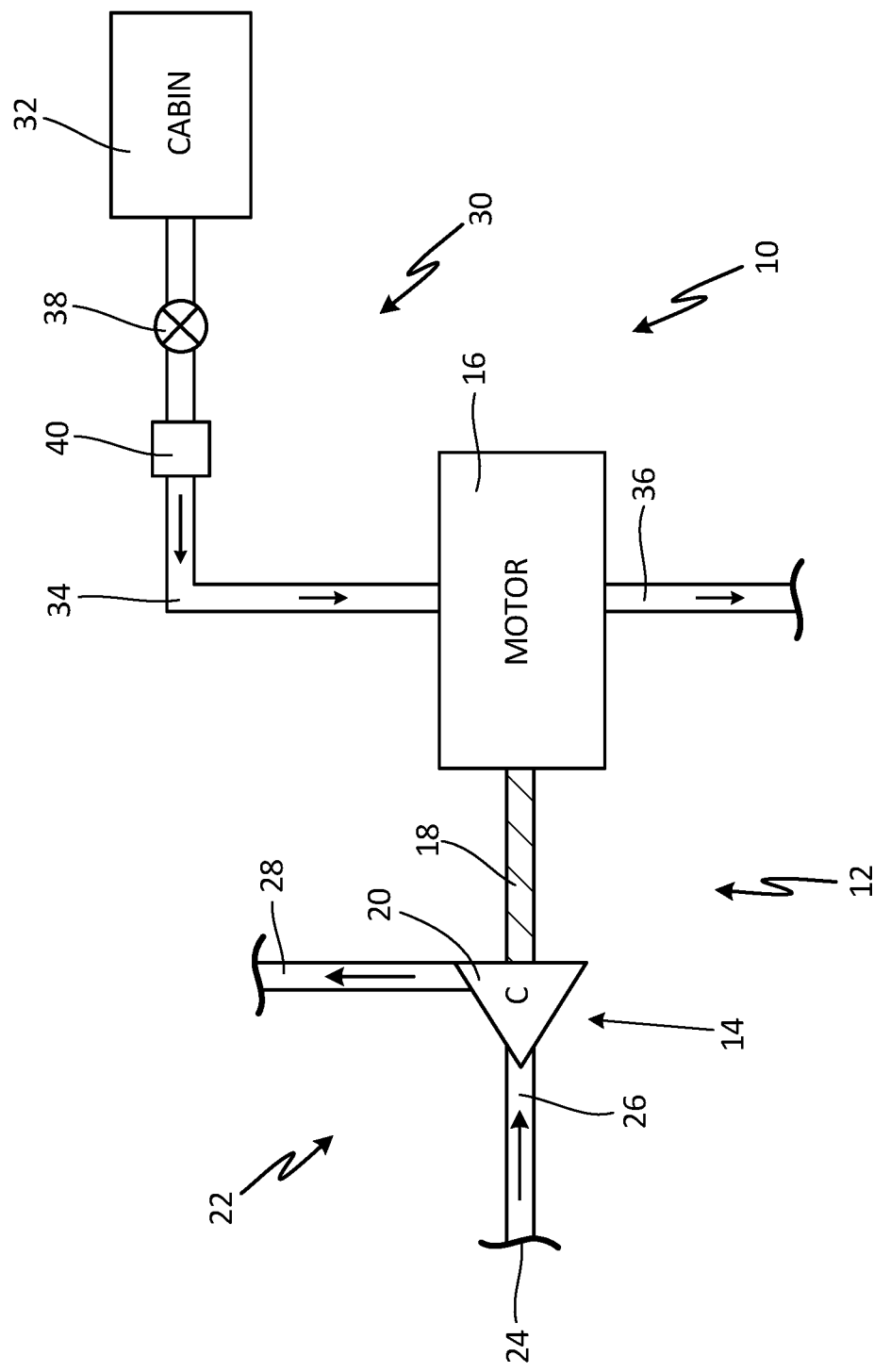
FIG. 1 is a schematic view of a cabin air cooling system.

FIG. 1 is a schematic view of cabin air cooling system 10. Cabin air cooling system 10 includes rotary machine 12, compressor 14, motor 16, shaft 18, compressor rotor 20, primary flow path 22, inlet 24, primary air ducts 26 and 28, secondary cooling flow path 30, cabin 32, cooling air ducts 34 and 36, shut-off valve 38, and pressure regulating device 40.

Cabin air cooling system 10 includes rotary machine 12. Rotary machine 12 includes compressor 14 and motor 16. Motor 16 is connected to compressor 14 with shaft 18. Compressor 14 includes compressor rotor 20. Compressor rotor 20 is mounted on shaft 18 and motor 16 drives compressor 14 by rotating compressor rotor 20 with shaft 18. Motor 16 includes a rotor and a stator.

Primary flow path 22 is a first flow path through rotary machine 12. Primary flow path 22 extends from inlet 24 to a second location in the aircraft. Primary flow path 22 includes primary air ducts 26 and 28. Primary air duct 26 extends between inlet 24 and compressor rotor 20. Primary air duct 28 extends from compressor rotor 20 to a second location in the aircraft. Air will enter primary flow path 22 through inlet 24. Inlet 24 draws air from an ambient unpressurized source exterior of the aircraft or from a pressurized bleed source on an aircraft, such as from the gas turbine engine, the cabin, or the cargo bay. The air that enters inlet 24 will flow through primary air duct 26 to compressor rotor 20. Compressor rotor 20 will compress the air and the compressed air will then flow through primary air duct 28. Primary air duct 28 will deliver the compressed air to a second location in the aircraft where compressed air is desired.

Secondary cooling flow path 30 is a second flow path through rotary machine 12. Secondary cooling flow path 30 extends from cabin 32 to a location overboard the aircraft. Secondary cooling flow path 30 includes cooling air ducts 34 and 36. Cooling air duct 34 extends from cabin 32 to motor 16. Cooling air duct 36 extends from motor 16 to a location overboard the aircraft. Air will enter secondary cooling flow path 30 from cabin 32. The cabin air from cabin 32 will flow through first cooling air duct 34 to motor 16. The cabin air will flow through the stator windings of motor 16 to cool motor 16. The cabin air will then flow through cooling air duct 36. Cooling air duct 36 will dump the cabin air overboard.

Shut-off valve 38 is positioned in cooling air duct 34 adjacent to cabin 32. Shut-off valve 38 isolates the flow of air from cabin 32 into secondary cooling flow path 30. This isolation valve is required in the event of a cabin decompression event, or where the system may be off and no motor cooling flow is required. Cabin 32 on the aircraft will include a pressure regulating system to ensure that the pressure in cabin 32 stays at a sufficient level. Shut-off valve 38 can be an electrical valve, a pneumatic valve, or any other suitable valve. Shut-off valve 38 will move between a first position where air will not be routed out of cabin 32 to secondary cooling air flow 30 and a second position where air can be routed from cabin 32 to secondary cooling air flow 30. Shut-off valve 38 can be moved to the first position where air is not routed out of cabin 32 if there is a pressure loss in cabin 32.

Also positioned in cooling air duct 34 is pressure regulating device 40. Pressure regulating device 40 is positioned between shut-off valve 38 and motor 16. Pressure regulating device 40 regulates the pressure of the air flowing from cabin 32 through motor 16. For example, pressure regulative device 40 can regulate the pressure of the cooling air so that it is flowing through secondary flow system 30 at a pressure of about 10 pounds per square inch absolute (psia). As cabin air from cabin 32 is kept at about 12.2 pounds per square inch absolute (psia), regulating the flow of cabin air to 10 pounds per square inch absolute (psia) ensures that there is good cabin air flow through secondary cooling system 30 at any given time. In alternate embodiments, cabin air cooling system 10 does not include pressure regulating device 40.

The air from cabin 32 varies in pressure depending on whether the aircraft is on the ground, changing altitude during takeoff or landing, or at a cruising altitude. On the ground, the pressure in cabin 32 is about 14.7 pounds per square inch absolute (psia), which is the same pressure of an ambient outside of the aircraft. At a cruising altitude, the pressure of the ambient outside of the aircraft will be lower. For example, at a cruising altitude of about 40,000 feet, the pressure of the ambient outside of the aircraft will be about 2-3 pounds per square inch absolute (psia). Due to the low pressure of an ambient outside of the aircraft at cruising altitude, cabin 32 has to be pressurized. The pressure in cabin 32 is kept at about 12.2 pounds per square inch absolute (psia). Cabin 32 also has to be pressurized during takeoff and landing, as the pressure of the ambient outside of the aircraft will change as the aircraft gains or losses altitude during takeoff and landing. During takeoff, landing, and at cruising altitudes, the air in the ambient outside of the aircraft will be at a lower pressure than the pressure in cabin 32, as cabin 32 is pressurized during flight. This will cause a pressure differential between cabin 32 and the ambient outside of the aircraft. The pressure differential will cause air to flow from cabin 32 to motor 16 through secondary cooling flow path 30.

Using cabin air to cool motor 16 is advantageous. Bleeding the air from cabin 32 for use as cooling air does not create any efficiency losses for the aircraft, as some of the air in cabin 32 is typically routed to be dumped overboard. Routing this air through secondary cooling flow path 30 prior to dumping it overboard does not create any efficiency losses for the aircraft. Further, the air in cabin 32 is kept at a constant temperature for comfort during flight, thus the cabin air that is bled into second cooling flow path 30 will be at a constant temperature. Typically, the temperature in cabin 32 is about 70 to 75 degrees Fahrenheit. The temperature in motor 16 will be about 300 to 350 degrees Fahrenheit. Thus, the cabin air is at a much lower temperature than the temperature of motor 16 and will provide good cooling for motor 16. Further, pressure regulating device 40 can regulate the pressure of the air from cabin 32 that flows through secondary cooling flow path 30 into motor 16. Having a consistent pressure can ensure that there is good cooling airflow through motor 16.

When compared to prior art methods of cooling, there are many benefits to using cabin air from cabin 32 for cooling air for motor 16. First, using ram air to cool motor 16 requires that air be routed through a ram air scoop on the skin of the aircraft, creating drag on the aircraft. Further, there is little to no pressure differential, as the ram air is scooped from the ambient exterior of the aircraft. Having little to no pressure differential means there is a weak flow of cooling air through motor 16. Using cabin air to cool motor 16 does not create any drag for the aircraft and there is a pressure differential that creates a good flow of air through motor 16.

Second, using air that has been compressed with compressor 14 creates an efficiency loss in compressor 14, as work is being done to compress air only to use the air for cooling. Further, air that is compressed with compressor 14 will be at a temperature of about 200 to 300 degrees Fahrenheit. As motor 16 is at about 300 to 350 degrees Fahrenheit, the air from compressor 14 will not provide significant cooling for motor 16. Using cabin air to cool motor 16 does not create any efficiency losses in compressor 14. Further, the cabin air is at a temperature of about 70 to 75 degrees Fahrenheit and will provide better cooling for motor 16.

Figure 2:
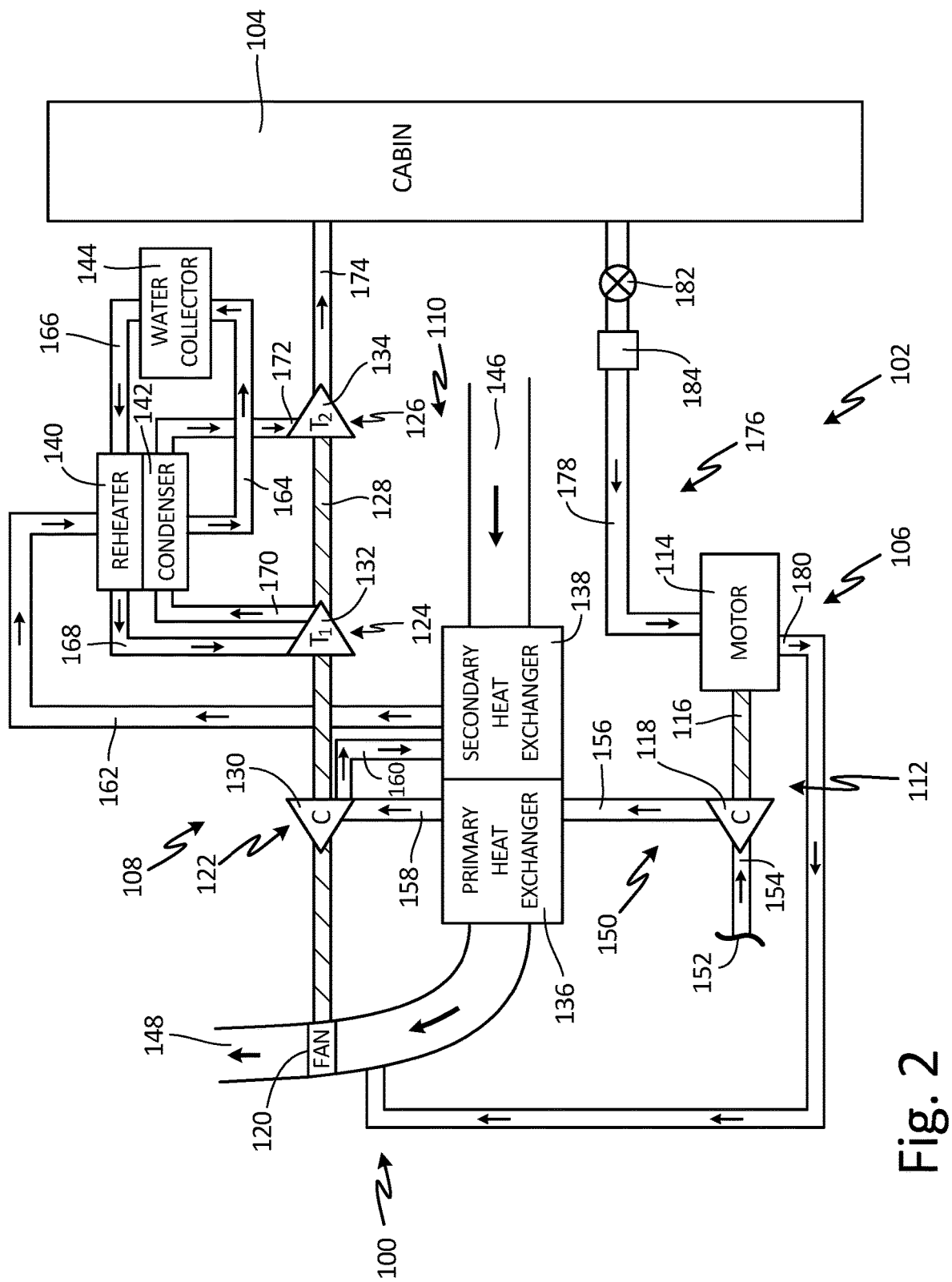
FIG. 2 is a schematic view of a cabin air cooling system for use with a cabin air compressor in an environmental control system.

FIG. 2 is a schematic view of cabin air cooling system 102 for use with cabin air compressor 106 in environmental control system 100. FIG. 2 shows environmental control system 100, cabin air cooling system 102, cabin 104, cabin air compressor 106, air cycle machine 108, ram air duct 110, compressor 112, motor 114, shaft 116, compressor rotor 118, fan 120, compressor 122, first turbine 124, second turbine 126, shaft 128, compressor rotor 130, first turbine rotor 132, second turbine rotor 134, primary heat exchanger 136, secondary heat exchanger 138, reheater 140, condenser 142, water collector 144, ram air inlet 146, ram air outlet 148, primary flow path 150, inlet 152, primary air ducts 156, 158, 160, 162, 164, 166, 168, 170, 172, and 174, secondary flow path 176, cooling air ducts 178 and 180, shut-off valve 182, and pressure regulating device 184.

Environmental control system 100 can be mounted in an aircraft to supply conditioned air to the aircraft cabin at the proper temperature and pressure. Environmental control system 100 includes cabin air cooling system 102 that provides cabin air from cabin 104 to cabin air compressor 106. Cabin air compressor 106 compresses air and delivers the compressed air to air cycle machine 108. Air cycle machine 108 conditions the air and delivers the air to cabin 104. Ram air duct 110 is also included that supplies cooling air to air cycle machine 106 and then dumps the cooling air overboard.

Cabin air compressor 106 includes compressor 112 and motor 114. Shaft 116 extends from motor 114 to compressor 112. Compressor rotor 118 of compressor 112 is mounted on shaft 116 and motor 114 drives compressor 112 by rotating compressor rotor 118 with shaft 116. Motor 114 includes a rotor and a stator.

Air cycle machine 108 includes fan 120, compressor 122, first turbine 124, and second turbine 126. In the embodiment shown in FIG. 2, air cycle machine 108 has two turbines. In alternate embodiments, air cycle machine 108 can have a single turbine. Shaft 128 extends from fan 120 to compressor 122 to first turbine 124 to second turbine 126. Compressor rotor 130 of compressor 122, first turbine rotor 132 of first turbine 124, and second turbine rotor 134 of second turbine 126 are mounted on shaft 128. Fan 120 is positioned in ram air duct 110. As air flows through air cycle machine 108, first turbine rotor 132 and second turbine rotor 134 impart work from the air and rotate shaft 128, thus rotating compressor rotor 130 and fan 120. Air cycle machine 108 also includes primary heat exchanger 136 and secondary heat exchanger 138. Primary heat exchanger 136 and secondary heat exchanger 138 are connected to one another. Reheater 140, condenser 142, and water collector 144 further form a part of air cycle machine 108.

Primary heat exchanger 136 and secondary heat exchanger 138 are positioned in ram air duct 110. Primary heat exchanger 136 and secondary heat exchanger 138 are used to cool the compressed air that flows through environmental control system 100 using cooling ram air. Ram air is pulled into ram air duct 110 through ram air inlet 146 with fan 110 during operation on the ground or air is forced into ram air duct 110 during flight. The ram air flows across primary heat exchanger 136 and secondary heat exchanger 138 to cool the compressed air that flows through primary heat exchanger 136 and secondary heat exchanger 138. The used ram air is then dumped overboard through ram air outlet 148.

Primary flow path 150 is a first flow path through cabin air compressor 106 and air cycle machine 108 of environmental control system 100. Air will enter primary flow path 150 through inlet 152. Inlet 152 draws air from an ambient unpressurized source exterior of the aircraft or from a pressurized bleed source on an aircraft, such as from the gas turbine engine, the cabin, or the cargo bay. The air that enters inlet 152 will flow through primary air duct 154 to compressor rotor 118. Compressor rotor 118 will compress the air. The compressed air will then flow through primary air duct 156 to primary heat exchanger 136.

Primary heat exchanger 136 will cool the compressed air with cooling ram air. The cooled air will then flow through primary air duct 158 to compressor rotor 130. Compressor rotor 130 will further compress the air. The compressed air will then flow through primary air duct 160 to secondary heat exchanger 138. Secondary heat exchanger 138 will further cool the compressor air with cooling ram air.

The cooled air from secondary heat exchanger 138 will then flow through primary air duct 162 to reheater 140 and condenser 142. Reheater 140 mixes the cooled air with recirculated air from cabin 104 to heat the cooled air. Condenser 142 condenses the cooled air by lowering the air temperature. The reheated and condensed air then flows through primary air duct 164 to water collector 144. Water collector 144 collects the condensed water out of the air. The air then flows through primary air duct 166 back through reheater 34. Air from reheater 140 then flows through primary air duct 168 through first turbine rotor 132. First turbine rotor 132 will extract energy from the air as the air expands as it flows across first turbine rotor 132. The energy extracted from the air is used to drive shaft 128.

Air from first turbine rotor 132 then flows through primary air duct 170 back through condenser 142. Air from condenser 142 then flows through primary air duct 172 to second turbine rotor 134. Second turbine rotor 134 will extract energy from the air as the air expands as it flows across first turbine rotor 134. The energy extracted from the air is used to drive shaft 128. Air from second turbine rotor 134 will then flow through primary air duct 174 to cabin 104.

Secondary cooling flow path 176 is a second flow path through cabin air compressor 106. Secondary cooling flow path 176 extends from cabin 104 to ram air duct 110. Cooling air duct 178 extends from cabin 104 to motor 114. Cooling air duct 180 extends from motor 114 to ram air duct 110. Air will enter secondary cooling flow path 176 from cabin 104. The cabin air from cabin 104 will flow through first cooling air duct 178 to motor 114. The cabin air will flow through the stator windings of motor 114 to cool motor 114. The cabin air will then flow through cooling air duct 180 to ram air duct 110 to be dumped overboard through ram air outlet 148 with used ram air.

Shut-off valve 182 is positioned in cooling air duct 178 adjacent to cabin 104. Shut-off valve 182 isolates the flow of air from cabin 104 into secondary cooling flow path 176. This isolation valve is required in the event of a cabin decompression event, or where the system does may be off and no motor cooling flow is required. Pressure regulating device 184 is also positioned in cooling air duct 178. Pressure regulating device 184 is positioned between shut-off valve 182 and motor 114. Pressure regulating device 184 regulates the pressure of the air flowing from cabin 104 through motor 114. In alternate embodiments, cabin air cooling system 102 does not include pressure regulating device 184.

Cabin air from cabin 104 can be used to cool motor 114 in cabin air compressor 106. Cabin air does not create any efficiency losses for the aircraft, as the cabin air that is to be dumped overboard can be used to cool motor 114 before being dumped overboard. Further, cabin air is at a constant temperature of about 70 to 75 degrees Fahrenheit and provides good cooling of motor 114, which is at a temperature of about 300 to 350 degrees Fahrenheit. Additionally, during takeoff, landing, and at cruising altitude, there will be a pressure differential that provides a good flow of cooling air from cabin 104 to motor 114.

Figure 3:
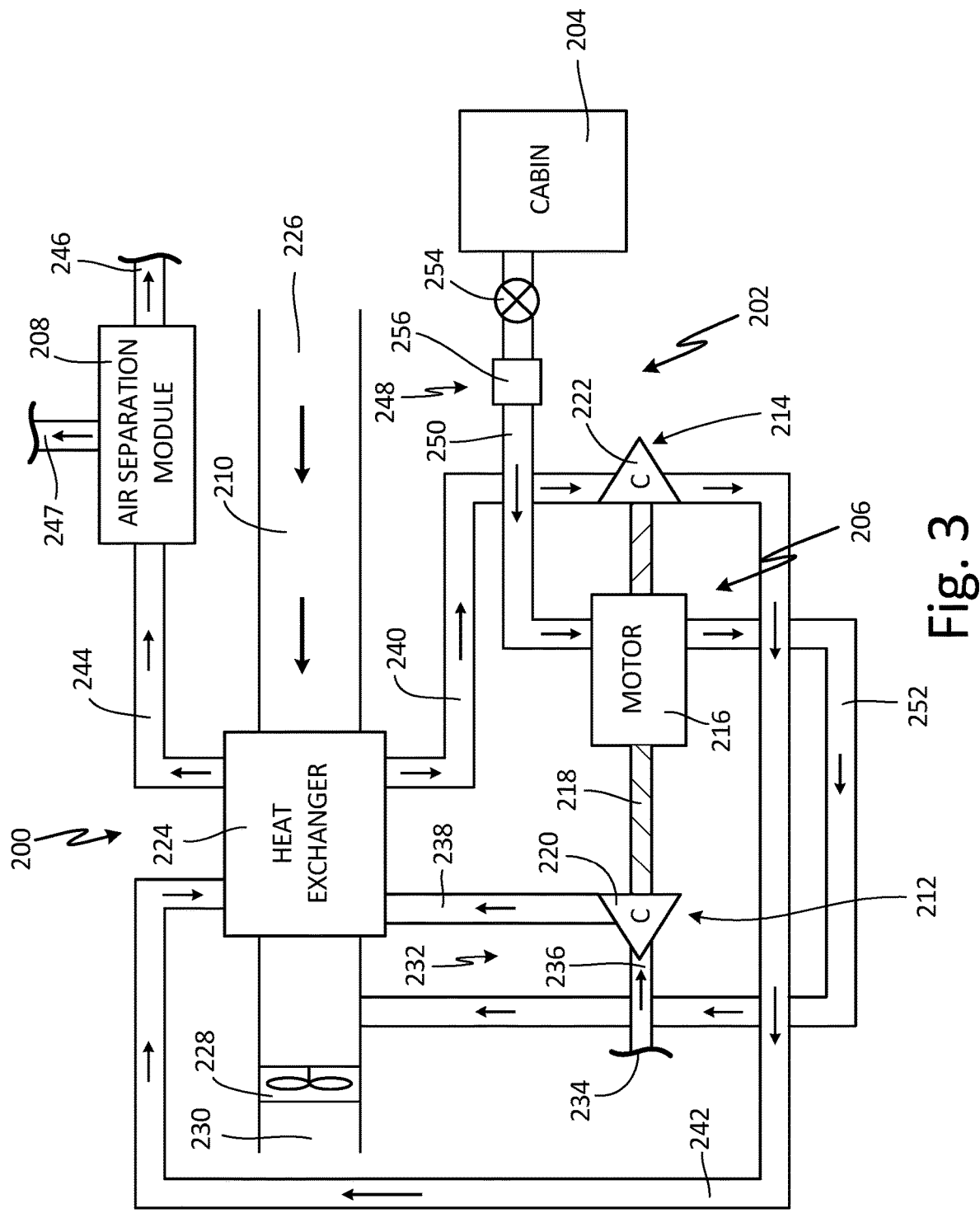
FIG. 3 is a schematic view of a cabin air cooling system for use with a motor driven compressor in a nitrogen generation system.

FIG. 3 is a schematic view of cabin air cooling system 202 for use with motor driven compressor 206 in nitrogen generation system 200. FIG. 3 includes nitrogen generation system 200, cabin air cooling system 202, cabin 204, motor driven compressor 206, air separation module 208, ram air duct 210, first compressor 212, second compressor 214, motor 216, shaft 218, first compressor rotor 220, second compressor rotor 222, heat exchanger 224, ram air inlet 226, ram air fan 228, ram air outlet 230, primary flow path 232, inlet 234, primary air ducts 236, 238, 240, 242, 244, 246, and 247, secondary cooling flow path 248, cooling air ducts 250 and 252, shut-off valve 254, and pressure regulating device 256.

Nitrogen generation system 200 creates nitrogen enriched air for delivery to fuel tanks on the aircraft for fuel tank inerting. Nitrogen generation system 200 includes cabin air cooling system 202 that provides cabin air from cabin 204 to motor driven compressor 206. Motor driven compressor 206 compresses air and delivers the compressed air to air separation module 208. Air separation modules 208 creates nitrogen enriched air and delivers the nitrogen enriched air to fuel tanks on the aircraft for fuel tank inerting. Ram air duct 210 is also included that supplies cooling air to nitrogen generation system 200 and then dumps the cooling air overboard.

Nitrogen generation system 200 includes motor driven compressor 206. Motor driven compressor 206 includes first compressor 212, second compressor 214, and motor 216. Shaft 218 extends from motor 216 to first compressor 212 and second compressor 214. First compressor rotor 220 and second compressor rotor 22 are mounted on shaft 218 and motor 216 drives first compressor 212 and second compressor 214 by rotating first compressor rotor 220 and second compressor rotor 222 about shaft 218. Motor 216 includes a rotor and a stator. Nitrogen generation system 200 further includes heat exchanger 224 and air separation module 208.

Heat exchanger 224 is positioned in ram air duct 210. Heat exchanger 224 is used to cool the compressed air that flows through nitrogen generation system 200 using cooling ram air. Ram air is pulled into ram air duct 210 through ram air inlet 226 with ram air fan 228 during operation on the ground or air is forced into ram air duct 210 during flight. The ram air flows across heat exchanger 224 to cool the compressed air that flows through heat exchanger 224. The used ram air is then dumped overboard through ram air outlet 230.

Primary flow path 232 is a first flow path through nitrogen generation system 200. Air will enter primary flow path 232 through inlet 234. Inlet 234 draws air from an ambient unpressurized source exterior of the aircraft or from a pressurized bleed source on an aircraft, such as from the gas turbine engine, the cabin, or the cargo bay. The air that enters inlet 234 will flow through primary air duct 236 to compressor rotor 220. Compressor rotor 220 will compress the air. The compressed air will then flow through primary air duct 238 to heat exchanger 224.

Heat exchanger 224 will cool the compressed air with cooling ram air. The cooled air will then flow through primary air duct 240 to compressor rotor 222. Compressor rotor 222 will further compress the air. The compressed air will then flow through primary air duct 242 to heat exchanger 224. Heat exchanger 224 will further cool the compressed air with cooling ram air.

The cooled air from heat exchanger 224 will then flow through primary air duct 244 to air separation module 208. Air separation module 208 will separate oxygen from the air, creating both oxygen enriched air and nitrogen enriched air. The nitrogen enriched air can then flow through primary air duct 246 to a fuel tank on the aircraft to be used for fuel tank inerting. The oxygen enriched air can flow through primary air duct 247 to be dumped overboard or used elsewhere on the aircraft.

Secondary cooling flow path 248 is a second flow path through motor driven compressor 206. Secondary cooling flow path 248 extends from cabin 204 to ram air duct 210. Cooling air duct 250 extends from cabin 204 to motor 216. Cooling air duct 252 extends from motor 216 to ram air duct 210. Air will enter secondary cooling flow path 248 from cabin 204. The cabin air from cabin 204 will flow through first cooling air duct 250 to motor 216. The cabin air will flow through the stator windings of motor 216 to cool motor 216. The cabin air will then flow through cooling air duct 252 to ram air duct 210 to be dumped overboard through ram air outlet 230 with used ram air.

Shut-off valve 254 is positioned in cooling air duct 250 adjacent to cabin 204. Shut-off valve 254 isolates the flow of air from cabin 204 into secondary cooling flow path 248. This isolation valve is required in the event of a cabin decompression event, or where the system does may be off and no motor cooling flow is required. Pressure regulating device 256 is also positioned in cooling air duct 250. Pressure regulating device 256 is positioned between shut-off valve 254 and motor 216. Pressure regulating device 256 regulates the pressure of the air flowing from cabin 204 through motor 216. In alternate embodiments, cabin air cooling system 202 does not include pressure regulating device 256.

Cabin air from cabin 204 can be used to cool motor 216 in motor driven compressor 206. Cabin air does not create any efficiency losses for the aircraft, as the cabin air that is to be dumped overboard can be used to cool motor 216 before being dumped overboard. Further, cabin air is at a constant temperature of about 70 to 75 degrees Fahrenheit and provides good cooling of motor 216, which is at a temperature of about 300 to 350 degrees Fahrenheit. Additionally, during takeoff, landing, and at cruising altitude, there will be a pressure differential that provides a good flow of cooling air from cabin 204 to motor 216.

Discussion of Possible Embodiments

The following are non-exclusive descriptions of possible embodiments of the present invention.

A system for cooling a motor includes a rotary machine and a cooling flow path. The rotary machine includes a motor including a rotor and a stator, a compressor including a compressor rotor, and a shaft extending between the motor and the compressor rotor. The cooling flow path is configured to deliver cooling air from a cabin of an aircraft to the motor.

The system of the preceding paragraph can optionally include, additionally and/or alternatively, any one or more of the following features, configurations and/or additional components:

The system further includes a first cooling air duct extending between the cabin of an aircraft and the motor and a second cooling air duct extending from the motor. The first cooling air duct is configured to deliver cooling air from the cabin of the aircraft to the motor and the second cooling air duct is configured to dump cooling air from the motor to an ambient outside of the aircraft.

The system further includes a pressure regulating device positioned in the first cooling air duct between the cabin of the aircraft and the motor. The pressure regulating device is configured to regulate the pressure of the cooling air flowing to the motor.

The system further includes a shut-off valve positioned in the first cooling air duct between the cabin of the aircraft and the motor. The shut-off valve is configured to stop the flow of cooling air to the motor.

The system further includes a primary flow path that is configured to deliver air to the compressor. The primary flow path includes a first primary air duct extending between an inlet and the compressor rotor and a second primary air duct extending from the compressor rotor. The first primary air duct is configured to deliver air to the compressor rotor. The second primary air duct is configured to deliver the compressed air to a second location in the aircraft.

Wherein the rotary machine is a cabin air compressor.

Wherein the cabin air compressor is configured to deliver compressed air to an air cycle machine. The air cycle machine includes a shaft extending through the air cycle machine; a fan section mounted on the shaft; a compressor section with a compressor rotor mounted on the shaft; a first turbine section with a first turbine rotor mounted on the shaft; and a second turbine section with a second turbine rotor mounted on the shaft.

Wherein the rotary machine is a motor driven compressor.

Wherein the compressor with the compressor rotor is a first compressor with a first compressor rotor, and wherein the motor driven compressor further includes a second compressor with a second compressor rotor.

Wherein the motor driven compressor is configured to deliver compressed air to a nitrogen generation system. The nitrogen generation system includes an air separation module that is configured to create nitrogen enriched air and to deliver the nitrogen enriched air to a fuel tank.

A method of cooling a motor includes ducting air along a cooling flow path from a cabin of an aircraft to a motor of a rotary machine. The motor is connected to a compressor rotor of a compressor with a shaft. The motor is cooled with the cabin air. The air is ducted along the cooling flow path from the motor to a location overboard the aircraft.

The method of the preceding paragraph can optionally include, additionally and/or alternatively, any one or more of the following features, configurations and/or additional components:

The method further includes regulating the pressure of the air flowing from the cabin to the motor.

The method further includes moving a shut-off valve to a first position to stop the flow of air from the cabin to the motor, and moving the shut-off valve to a second position to allow the flow of air from the cabin to the motor.

The method further includes ducting air along a primary flow path from an inlet to the compressor rotor, compressing the air with the compressor rotor, and ducting the compressed air to a second location in the aircraft.

Wherein the rotary machine is a cabin air compressor that forms part of an environmental control system with an air cycle machine.

Wherein ducting the compressed air to a second location in the aircraft includes ducting the compressed air to the air cycle machine.

The method further includes ducting the compressed air through a primary heat exchanger to cool the compressed air; ducting the air through a compressor in the air cycle machine to compress the air with a compressor rotor; ducting the compressed air through a secondary heat exchanger to cool the compressed air; ducting the air through a turbine in the air cycle machine to expand the air through a turbine rotor; and ducting the air to a cabin.

Wherein the rotary machine is a motor driven compressor that forms part of a nitrogen generation system with an air separation module.

Wherein ducting the compressed air to a second location in the aircraft includes ducting the compressed air to air separation module.

The method further includes ducting the compressed air through a heat exchanger to cool the compressed air; ducting the air through a second compressor in the motor driven compressor to compress the air with a second compressor rotor; ducting the compressed air through the heat exchanger to cool the compressed air; ducting the air through an air separation module to create nitrogen enriched air; and ducting the nitrogen enriched air to a fuel tank on the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for cooling a motor, the system comprising:
    a rotary machine, wherein the rotary machine comprises:
        a motor including a rotor and a stator;
        a compressor including a compressor rotor;
        a shaft extending between the motor and the compressor rotor; and
    a cooling flow path that is configured to deliver cooling air from a cabin of an aircraft to the motor, the cooling flow path comprising:
        a first cooling air duct extending between the cabin of an aircraft and the motor, wherein the first cooling air duct is configured to deliver cooling air from the cabin of the aircraft to the motor;
        a shut-off valve positioned in the first cooling air duct between the cabin of the aircraft and the motor, wherein the shut-off valve is configured to stop the flow of cooling air from the cabin to the motor; and
        a pressure regulating device positioned in the first cooling air duct downstream of the cabin and between the shut-off valve and the motor, wherein the pressure regulating device is configured to regulate the pressure of the cooling air flowing to the motor from the cabin to a pressure that is lower than a cabin air pressure.

2. The system of claim 1, and further comprising:
    a second cooling air duct extending from the motor, wherein the second cooling air duct is configured to dump cooling air from the motor to an ambient outside of the aircraft.

3. The system of claim 1, and further comprising:
    a primary flow path that is configured to deliver air to the compressor, wherein the primary flow path comprises:
        a first primary air duct extending between an inlet and the compressor rotor, wherein the first primary air duct is configured to deliver air to the compressor rotor; and
        a second primary air duct extending from the compressor rotor, wherein the second primary air duct is configured to deliver the compressed air to a second location in the aircraft.

4. The system of claim 1, wherein the rotary machine is a cabin air compressor.

5. The system of claim 4, wherein the cabin air compressor is configured to deliver compressed air to an air cycle machine, wherein the air cycle machine further comprises:
    a shaft extending through the air cycle machine;
    a fan section mounted on the shaft;
    a compressor section with a compressor rotor mounted on the shaft;
    a first turbine section with a first turbine rotor mounted on the shaft; and
    a second turbine section with a second turbine rotor mounted on the shaft.

6. The system of claim 1, wherein the rotary machine is a motor driven compressor.

7. The system of claim 6, wherein the compressor with the compressor rotor is a first compressor with a first compressor rotor, and wherein the motor driven compressor further comprises:
    a second compressor with a second compressor rotor.

8. The system of claim 6, wherein the motor driven compressor is configured to deliver compressed air to a nitrogen generation system, wherein the nitrogen generation system further comprises:
    an air separation module that is configured to create nitrogen enriched air and to deliver the nitrogen enriched air to a fuel tank.

9. A method of cooling a motor comprises:
    ducting air along a cooling flow path from a cabin of an aircraft to a motor of a rotary machine, wherein the motor is connected to a compressor rotor of a compressor with a shaft;
    cooling the motor with the cabin air;
    ducting the air along the cooling flow path from the motor to a location overboard the aircraft;
    moving a shut-off valve to a first position to stop the flow of air from the cabin to the motor;
    moving the shut-off valve to a second position to allow the flow of air from the cabin to the motor; and
    regulating the pressure of the air flowing from the cabin to the motor with a pressure regulating device positioned downstream of the cabin and between the shut-off valve and the motor, wherein the pressure regulating device regulates the pressure of the cooling air flowing to the motor from the cabin to a pressure that is lower than a cabin air pressure.

10. The method of claim 9, and further comprising:
ducting air along a primary flow path from an inlet to the compressor rotor;
compressing the air with the compressor rotor; and
ducting the compressed air to a second location in the aircraft.

11. The method of claim 10, wherein the rotary machine is a cabin air compressor that forms part of an environmental control system with an air cycle machine.

12. The method of claim 11, wherein ducting the compressed air to a second location in the aircraft includes ducting the compressed air to the air cycle machine.

13. The method of claim 12, and further comprising:
ducting the compressed air through a primary heat exchanger to cool the compressed air;
ducting the air through a compressor in the air cycle machine to compress the air with a compressor rotor;
ducting the compressed air through a secondary heat exchanger to cool the compressed air;
ducting the air through a turbine in the air cycle machine to expand the air through a turbine rotor; and
ducting the air to a cabin.

14. The method of claim 10, wherein the rotary machine is a motor driven compressor that forms part of a nitrogen generation system with an air separation module.

15. The method of claim 14, wherein ducting the compressed air to a second location in the aircraft includes ducting the compressed air to air separation module.

16. The method of claim 15, and further comprising:
ducting the compressed air through a heat exchanger to cool the compressed air;
ducting the air through a second compressor in the motor driven compressor to compress the air with a second compressor rotor;
ducting the compressed air through the heat exchanger to cool the compressed air;
ducting the air through an air separation module to create nitrogen enriched air; and
ducting the nitrogen enriched air to a fuel tank on the aircraft.

* * * * *